United States Patent [19]
Cook

[11] Patent Number: 5,173,801
[45] Date of Patent: Dec. 22, 1992

[54] WIDE FIELD OF VIEW AFOCAL THREE-MIRROR ANASTIGMAT

[75] Inventor: Lacy G. Cook, El Segundo, Calif.

[73] Assignee: Hughes Aircraft Company, Los Angeles, Calif.

[21] Appl. No.: 745,678

[22] Filed: Aug. 16, 1991

[51] Int. Cl.$^5$ .................. G02B 17/06; G02B 23/06; G02B 5/08

[52] U.S. Cl. .................. 359/365; 359/366; 359/861

[58] Field of Search ............ 350/504, 505, 618, 619, 350/620, 627; 359/365, 366, 858, 859, 861

[56] References Cited

U.S. PATENT DOCUMENTS

| | | | |
|---|---|---|---|
| 2,306,679 | 12/1942 | Warmisham | 350/620 |
| 2,970,518 | 2/1961 | Ross | 350/620 |
| 3,674,334 | 7/1972 | Offner . | |
| 4,205,902 | 6/1980 | Shafer | 359/366 |
| 4,598,981 | 7/1986 | Hallam et al. | 350/505 |
| 4,834,517 | 5/1989 | Cook | 359/366 |
| 4,861,148 | 8/1989 | Sato et al. | 350/620 |
| 5,063,586 | 11/1991 | Jewell et al. | 359/859 |

FOREIGN PATENT DOCUMENTS

| | | | |
|---|---|---|---|
| 0042014 | 3/1982 | Japan | 350/620 |
| 0579592 | 11/1977 | U.S.S.R. | 350/505 |
| 1167567 | 7/1985 | U.S.S.R. | 350/620 |

OTHER PUBLICATIONS

King; "Unobscured Laser-Beam-Expander Pointing System with Tilted Spherical Mirrors"; Applied Optics; Jan. 1974; vol. 13; No. 1 pp. 21–22.

Primary Examiner—Bruce Y. Arnold
Assistant Examiner—R. D. Shafer
Attorney, Agent, or Firm—G. S. Grunebach; William J. Streeter; Wanda K. Denson-Low

[57] ABSTRACT

An all-reflective three-mirror afocal system has a negative power primary (12), positive power secondary (14), and positive power tertiary (16) mirror which form an afocal reimaging optical system. The system is capable of imaging very wide fields of view at low magnification and may be utilized in pilotage, navigation, driving or the like operations.

13 Claims, 2 Drawing Sheets

WIDE FIELD OF VIEW AFOCAL THREE-MIRROR ANASTIGMAT

BACKGROUND OF THE INVENTION

1. Technical Field

This invention relates to a wide field of view optical system and, more particularly, to an all-reflective afocal three-mirror anastigmat optical system.

2. Discussion

Wide field of view optical systems, such as reflective, afocal telescopes are utilized in multispectral applications and in certain space sensor systems. The use of these wide field of view optical systems is to provide large unobscured two-dimensional fields of view. The image space field of view may be viewed at the exit pupil by various types of scanning or staring sensors which consist generally of an imaging optical system and a detector array. This information may be separated by dichroic beamsplitters and used by several sensors or imaging optics with detector arrays operating in different spectral bands of interest.

An example of a three-mirror all-reflective afocal telescope is illustrated by U.S. Pat. No. 3,674,334 issued Jan. 4, 1971 to Offner entitled, "Catoptric Anastigmatic Afocal Optical System". The patent illustrates a series of variations on a three-mirror reimaging telescope with a mirror power distribution that is positive-negative-positive. While these designs appear to be useful for certain applications, they are not capable of wide fields of view nor are they well suited for low magnifications.

An all-reflective afocal telescope like that illustrated in U.S. Pat. No. 4,804,258 issued Feb. 14, 1989 to Kebo, entitled, "Four-Mirror Afocal Wide Field of View Optical System", assigned to the same assignee as the present invention, the specification of which is herein expressly incorporated by reference, illustrates a four-mirror reimaging telescope with a mirror power distribution that is positive-negative-positive-positive. While this design has more field of view capability than Offner, there is additional complexity of the fourth mirror and this design is not well suited for low magnifications.

In scanning FLIR systems where a wide field of view is required more so than high resolution (eg., for application involving pilotage, navigation, driving), low magnification afocal telescopes are typically employed in front of the scanner, imager, and detector/dewar. These afocal telescopes often have magnifications near or less than unity in order to increase the object space field of view over that generated by the scanner and imager. Object space fields of 20×30, 20×40, and 30×40 degrees are typical for these applications. In the past, these applications have been exclusively performed by refractive systems.

Various types of refractive systems provide large field of view capabilities at low magnifications, however, these refractive systems have several disadvantages. Some limitations of refractive telescopes are chromatic aberrations, spectral limitations (eg., visible TV system cannot share the same telescope as the LWIR FLIR), defocus with temperature change requiring compensation, potentially high narcissus, and high cost associated with the complexity and expensive refractive materials.

SUMMARY OF THE INVENTION

According to the teachings of the present invention, a system is provided which retains the versatility and benefits of reflective optics while eliminating the disadvantages of refractive optical systems. The present invention provides an all-reflective afocal three-mirror anastigmat which provides very wide field of view capabilities. The very wide field of view enables the invention to be utilized in pilotage, navigation, or driving operations. The present invention also enables multi-spectral operations such as combining visible TV or MWIR with the basic LWIR FLIR.

The present invention provides the art with an all-reflective afocal telescope which exhibits substantially unobscured aperture and field capabilities. The present invention is relatively simple, low cost, has broad spectral coverage, high transmission and is substantially narcissus free. The present invention provides an all-reflective optical system with wide fields of view which have previously only been achieved by the use of refractive optical systems.

In the preferred embodiment, the all-reflective wide field of view optical system includes a primary, secondary, and tertiary mirror. The primary, secondary and tertiary mirrors are positioned to receive and reflect energy from the object being viewed to a plane for viewing. The primary, secondary, and tertiary mirrors have surfaces shaped to reflect through an exit pupil, and provide a large area field of view enabling pilotage, navigation, driving or the like. Ordinarily, the system has low magnification.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
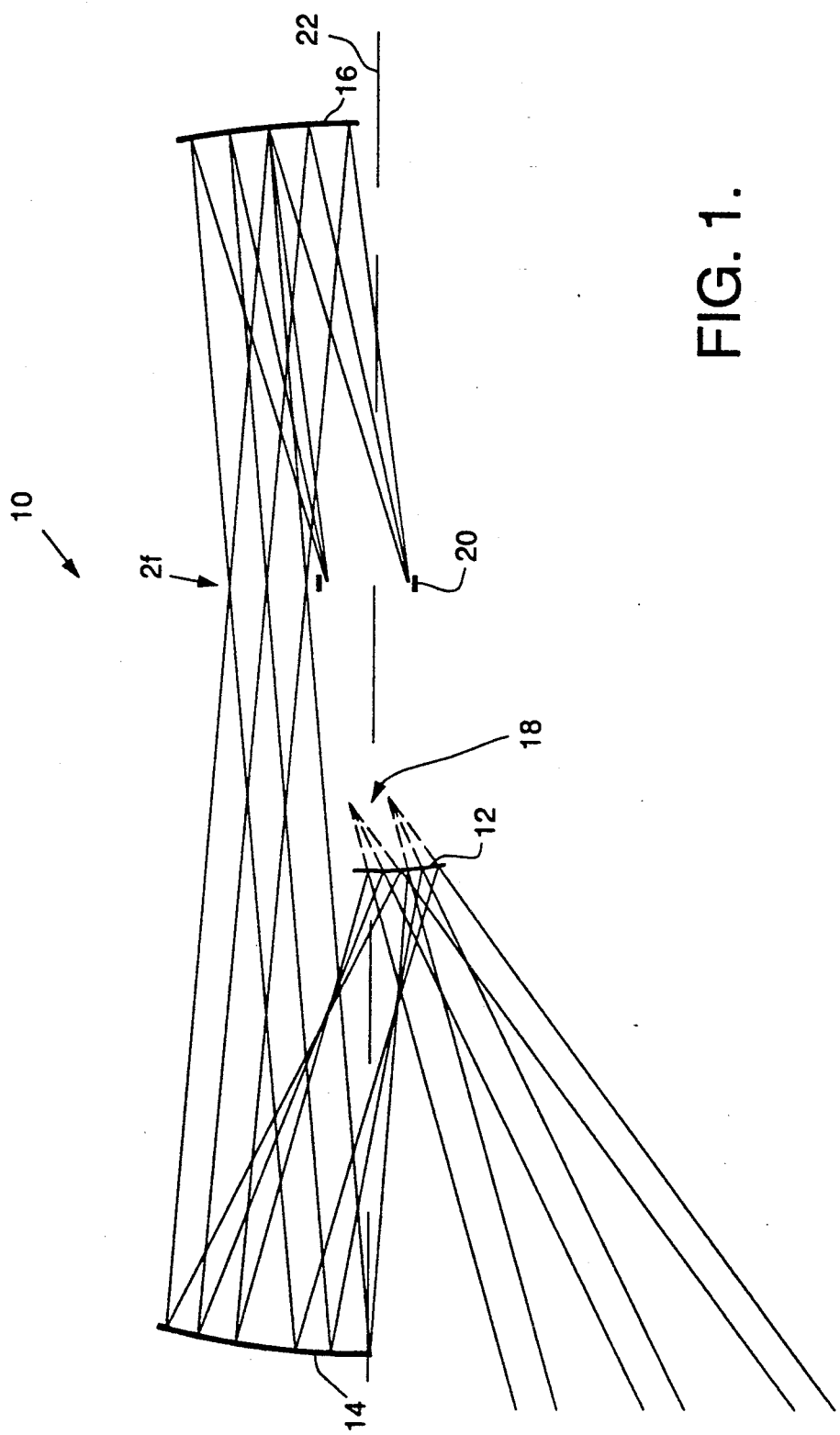
FIG. 1 is a schematic view of an elevation view of an apparatus in accordance with the teachings of the present invention.
Figure 2:
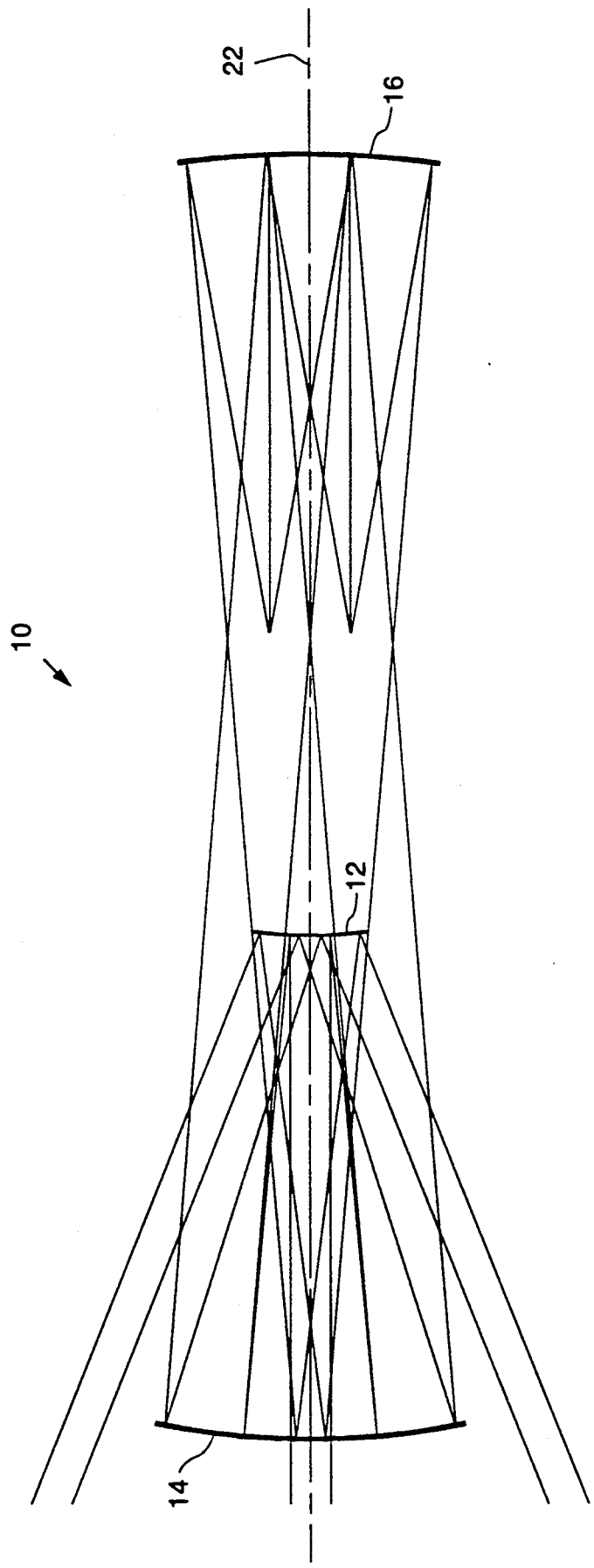
FIG. 2 is a schematic diagram of an azimuth view of the apparatus of FIG. 1.

Referring to FIGS. 1 and 2, a three-mirror afocal optical system is illustrated and designated with the reference numeral 10. The system is a relayed, reimaging afocal optical system including three powered mirrors. The system 10 includes a primary mirror 12, secondary mirror 14, and tertiary mirror 16. Also, the system includes a virtual entrance aperture 18, an intermediate image 24, and exit pupil 20.

The primary mirror 12 includes a central axis which defines the system optical axis 22. The primary mirror 12 is a negative power mirror and may be a conic or higher order aspheric mirror. However, in some instances and configurations, the primary mirror may be spherical.

The secondary mirror 14 is a positive power mirror and is positioned such that it is in a reverse Cassegrain-like configuration with the primary mirror 12. The secondary mirror is positioned substantially on-axis with respect to the optical axis 22. The secondary mirror 14 may be a conic or higher order aspheric mirror. However, in some instances, the secondary mirror may be spherical.

The tertiary mirror 16 is a positive power mirror. The tertiary mirror is positioned substantially on-axis with respect to the optical axis 22 of the system. The tertiary mirror 16 may be a conic or higher order aspheric mirror. However, in some instances and designs, the tertiary mirror may be spherical.

The primary and secondary mirrors act as an objective part of the telescope to form an intermediate image at 24. The tertiary mirror 16 acts as the eyepiece of the telescope and recollimates the energy from the intermediate image to a plane for viewing. Thus, as energy is reflected from the object being viewed to the primary mirror 12 and secondary mirror 14, an intermediate image is formed prior to the energy reflecting to the tertiary mirror 16 and ultimately to a plane for viewing at the exit pupil 20.

The entrance pupil 18 and the exit pupil 20 are generally centered on the optical axis 22. The field of view is entirely offset from the optical axis 22.

The primary 12, secondary 14, and tertiary 16 mirrors form a relayed afocal three-mirror anastigmat telescope capable of imaging wide fields of view at low magnifications. The system is capable of wide fields of view of at least 20×30 degrees at a magnification of about 1× or less.

Generally, the mirrors are machined using precision diamond turning techniques which provide for high optical transmission. Also, the precision machining enables fewer total parts and the use of relatively inexpensive materials when compared to refractive elements.

A specific prescription for the system in accordance with the present invention as illustrated in FIGS. 1 and 2 is as follows:

OPTICAL PRESCRIPTION OF A SPECIFIC EMBODIMENT OF THE OPTICAL SYSTEM OF THE PRESENT INVENTION

TABLE 1

SPHERICAL MIRROR EMBODIMENT

| Description | Radius | CC | Thickness | Tilt | Decenter |
|---|---|---|---|---|---|
| (18) Entrance Pupil | ∞ | — | −0.3875 | — | — |
| (12) Primary Mirror | 1.9823 | 0 | −2.2035 | — | — |
| (14) Secondary Mirror | 3.3018 | 0 | 5.3178 | — | — |
| (16) Tertiary Mirror | −4.0237 | 0 | −2.0000 | — | — |
| (20) Exit Pupil | ∞ | — | — | — | — |

TABLE 2

CONIC MIRROR EMBODIMENT

| Description | Radius | CC | Thickness | Tilt | Decenter |
|---|---|---|---|---|---|
| (18) Entrance Pupil | — | — | −0.3635 | — | — |
| (12) Primary Mirror | 1.9040 | 1.9979 | −2.2035 | — | — |
| (14) Secondary Mirror | 3.2332 | −0.01469 | 5.3148 | — | — |
| (16) Tertiary Mirror | −3.9956 | 0.16265 | −2.0000 | — | — |
| (20) Exit Pupil | ∞ | — | — | — | — |

Both Embodiments:
MAGNIFICATION RATIO: 0.5 ×
ENTRANCE PUPIL DIAMETER: 0.25
EXIT PUPIL DIAMETER: 0.50
FIELD OF VIEW: 20° × 40°
FIELD OF VIEW OFFSET: 20° (to lower edge)
(+) Distance are to the right along primary mirror optical axis
(+) Radii have centers to the right
(+) Decenters are up
(+) Tilts are counterclockwise, degrees
CC Conic Constant = (Eccentricity)$^2$
Decenters are done before tilting
Thicknesses are between mirror vertices before decenters and tilts are applied.
All dimensions are in inches unless specified otherwise.

The above design has a 20×40 degree field of view and a 0.25 inch aperture in object space. The afocal magnification is 0.5. The field of view at the exit pupil is thus 10×20 degrees and the aperture is 0.5 inch. When the system is used in a scanning FLIR, the scanner is located at the telescope exit pupil, and a 10 degree line field of view detector array is scanned through 20 degrees to generate a 20×40 degree field of view in object space. Other embodiments of the invention may accommodate up to 30 degrees field of view in the elevation plane and fields exceeding 40 degrees in the azimuth plane.

The present invention has several advantages over conventional three-mirror anastigmatic optical systems. The present invention uses an all-reflective system to provide wide field of view at low magnifications. The present invention has field of view capabilities like those currently only available with refractive optical systems, but has the advantages of reflective optical systems. The present invention provides a system for field intensive sensing missions (eg., pilotage, navigation, driving or the like) while offering the advantages of reflective optical systems.

It should be understood that while this invention has been described in connection with the particular examples hereof, that various modifications, alterations and variations of the disclosed preferred embodiment can be made after having the benefit of the study of the specification, drawings and the subjoined claims.

What is claimed is:

1. A relayed afocal three-mirror optical system comprising:
   a negative power primary mirror defining an optical axis;
   a secondary mirror facing said primary mirror such that energy from a viewed object is reflected by said secondary mirror;
   a tertiary mirror positioned to receive energy from said secondary mirror and to recollimate the energy to a plane for viewing;

said primary, secondary and tertiary mirrors having surfaces shaped to reflect the energy through a real exit pupil located at said viewing plane providing the system with a very large field of view wherein said field of view is at least about 20×30 degrees suitable for pilotage, navigation or driving.

2. A relayed afocal three-mirror optical system comprising:

a negative power primary mirror defining an optical axis;

a secondary mirror facing said primary mirror such that energy from a viewed object is reflected by said secondary mirror;

a tertiary mirror positioned to receive energy from said secondary mirror and to recollimate the energy to a plane for viewing;

said primary, secondary and tertiary mirrors having surfaces shaped to reflect the energy through a real exit pupil located at said viewing plane providing the system with a very large field of view wherein said field of view is from about 20×30 degrees to about 30×40 degrees suitable for pilotage navigation or driving.

3. A relayed afocal three-mirror optical system comprising:

a negative power primary mirror defining an optical axis;

a secondary mirror facing said primary mirror such that energy from a viewed object is reflected by said secondary mirror;

a tertiary mirror positioned to receive energy from said secondary mirror and to recollimate the energy to a plane for viewing;

said primary, secondary and tertiary mirrors having surfaces shaped to reflect the energy through a real exit pupil located at said viewing plane providing the system with a very large field of view wherein said mirrors have spherical surfaces and said field of view is from about 20×30 degrees to about 30×40 degrees suitable for pilotage, navigation or driving.

4. A relayed afocal three-mirror optical system comprising:

a negative power primary mirror defining an optical axis;

a secondary mirror facing said primary mirror such that energy from a viewed object is reflected by said secondary mirror;

a tertiary mirror positioned to receive energy from said secondary mirror and to recollimate the energy to a plane for viewing;

said primary, secondary and tertiary mirrors having surfaces shaped to reflect the energy through a real exit pupil located at said viewing plane providing the system with a very large field of view wherein said mirrors have conic surfaces and said field of view is form about 20×30 degrees to about 30×40 degrees suitable for pilotage, navigation or driving.

5. A relayed afocal three-mirror optical system, comprising:

a primary mirror defining an optical axis, said primary mirror having negative power;

a secondary mirror facing said primary mirror such that energy from a viewed object is reflected by said secondary mirror, said secondary mirror having positive power;

an intermediate image formed by said primary and secondary mirrors;

a tertiary mirror positioned to receive energy from said secondary mirror recollimate the energy, to a plane for viewing, said tertiary mirror having positive power;

said primary, secondary and tertiary mirrors having surfaces shaped to reflect the energy through a real exit pupil, located at said viewing plane, providing the system with a very large field of view suitable for pilotage, navigation or driving.

6. The optical system according to claim 5 wherein said primary, secondary and tertiary mirrors have conic surfaces.

7. The optical system according to claim 5 wherein said mirrors have spherical surfaces.

8. The optical system according to claim 5 wherein said exit pupil is centered on the optical axis.

9. The optical system according to claim 5 wherein said system includes an entrance aperture centered on said optical axis.

10. The optical system according to claim 5 wherein said field of view is offset from said optical axis.

11. The optical system according to claim 5 wherein at least one mirror has a spherical surface.

12. The optical system according to claim 11 wherein said tertiary mirror recollimates the energy from said intermediate image.

13. The optical according to claim 5 wherein said system magnification is about 1× or less.

* * * * *